United States Patent [19]

Debsikdar et al.

[11] Patent Number: 4,610,866
[45] Date of Patent: Sep. 9, 1986

[54] METHOD FOR PRODUCING BETA-ALUMINAS

[75] Inventors: Jagadish C. Debsikdar, Columbus; Beebhas C. Mutsuddy, Lancaster, both of Ohio

[73] Assignee: Battelle Memorial Institute, Columbus, Ohio

[21] Appl. No.: 786,777

[22] Filed: Oct. 11, 1985

[51] Int. Cl.$^4$ .............................................. C04B 35/10
[52] U.S. Cl. ..................................... 423/600; 501/153
[58] Field of Search ................. 423/600, 625; 501/153

[56] References Cited

U.S. PATENT DOCUMENTS

| 3,795,723 | 3/1974 | Clendenen et al. | 423/600 |
|---|---|---|---|
| 3,859,427 | 1/1975 | Francis et al. | 423/600 |
| 4,024,214 | 5/1977 | Foster et al. | 423/600 |
| 4,068,048 | 1/1978 | Desplanches et al. | 423/600 |
| 4,082,826 | 4/1978 | Iijima | 423/600 |
| 4,083,919 | 4/1978 | Pearlman | 423/600 |
| 4,167,550 | 9/1979 | Duncan | 423/600 |
| 4,244,986 | 1/1981 | Paruso et al. | 423/600 |

FOREIGN PATENT DOCUMENTS

| 14337 | 4/1972 | Japan | 423/600 |
|---|---|---|---|
| 26006 | 2/1983 | Japan | 423/600 |
| 41724 | 3/1983 | Japan | 423/600 |

OTHER PUBLICATIONS

L. N. Glyzina et al, "Synthesis of Sodium $\beta$-Alumina", Inorg. Mater. (USA), vol. 11, No. 6 (Jun. 1975), 927–929.

G. A. Vydrik et al, "Synthesis of Cesium $\beta$-Alumina", Inorg. Mater., (USA), vol. 8, No. 2 (Feb. 1972), 366–367.

A. K. Ray et al, "Synthesis of Sodium $\beta$ and $\beta''$ Alumina", Mat. Res. Bull., vol. 10, No. 6 (Jun. 1975), 583–590.

Primary Examiner—John Doll
Assistant Examiner—Wayne A. Langel
Attorney, Agent, or Firm—Klaus H. Wiesmann

[57] ABSTRACT

A beta and beta''-alumina precursor sol is prepared by controlled hydrolysis of chelated aluminum alkoxide in an alcohol solvent and, subsequently reacting it with a mixture of sodium, magnesium, and lithium alkoxides or acetates or a mixture thereof. The sol thus obtained can be converted into an amorphous transparent gel at low temperatures. This amorphous gel, crystallizes directly into crystalline beta-aluminas at about 1020° C. On heating to about this temperature, crystalline beta and beta''-alumina are formed which are useful as solid electrolyte material in making a sodium-sulfur battery.

20 Claims, No Drawings

METHOD FOR PRODUCING BETA-ALUMINAS

FIELD OF THE INVENTION

This invention relates to synthesis of beta-aluminas by a sol gel process that utilizes chelated aluminum alkoxide to achieve crystalline beta-aluminas at lower temperatures.

BACKGROUND OF THE INVENTION

The product of the present invention has utility as a ceramic electrolyte for sodium-sulfur batteries. These batteries have high energy and power densities that make them useful in electric vehicle propulsion and energy storage systems for load leveling applications in electric generating plants. Other commercial applications of beta-aluminas include liquid sodium purification and thermoelectric power generation.

The term beta-aluminas as used herein is meant to include both beta and beta"-alumina. These could occur together or alone depending on the relative concentration of sodium and aluminum.

Typical literature that describes the state of the art includes: "Formation of Continuous Beta-Alumina Films and Coatings at Low Temperatures", B. E. Yoldas et al, Ceramic Bulletin, Vol. 59, No. 6, pp. 640–642 (1980) that describes a method that allows a sintering temperature of 1200° C. "Recent Progress in the Development of Beta-Alumina for the Sodium-Sulphur Battery", G. J. May et al, Electrochemica Acta, Vol. 24, pp. 755–763 (1979) which describes progress and problems with production of beta-aluminas. "Sintering of Beta-Alumina Powders Obtained by Sol-Gel Process", Preliminary Studies, A. Deptula et al, Proceedings of the 5th International Round Table Conference on Sintering, Material Science Monographs, Vol. 14, pp. 219–226 (1982) which is a study of optimum conditions for obtaining beta"-alumina.

U.S. patents that are typical of art in this area include the below.

U.S. Pat. No. 4,244,986, which describes a process for forming sodium beta-aluminas by forming an agglomerate free hydrolized sol with an acid peptizing Na(OR) and Al(OR$_3$) alkoxide compounds in such a manner that a slurry of surface active polymers containing Na, Al, OR, and OH groups are formed. The peptizing acid is absorbed on the polymer surface. Initially, excess Na$_2$O is required because of Na$_2$O loss during subsequent heat treatment. Gelation is avoided by keeping the aluminum concentration of the sol below 2.5 equivalent percent. The sol is heated at 1200° C. to 1400° C. to form crystalline sodium beta-aluminas.

U.S. Pat. No. 4,208,475 illustrates a method for making an ion conductive ceramic by reacting partially hydrolized sodium and aluminum alkoxides together with heat stabilizers such as lithium, magnesium and potassium alkoxides, oxides or carbonates. Excess sodium is required and complete crystallization takes place only above 1200° C.

U.S. Pat. No. 4,083,919 describes a method of producing beta-aluminum at lower temperatures. Beta-alumina is precipitated as a gel and an amorphous material is produced by heating to about 900° C. Further heating and pressing at elevated temperatures, about 1200° C. and about 4000 psi, is needed to obtain a crystalline ceramic product.

Other methods for preparing beta-aluminas are known in the literature and patent art. One of the most common methods involves calcination of mechanically mixed alpha-alumina and dopant salts followed by ball milling to produce sinterable powder. Other preparation methods include spray drying of an aqueous slurry of boehmite or alpha-alumina and soluable alkalies, co-precipitation of complex oxylates of the constituent elements, and spray freezing or freeze drying of an aqueous solution of the soluble salts of the constituent elements.

The crystallization behavior of the powders synthesized by the above procedures show three types of crystallization paths. Because chemical inhomogeneity of the powders is inherent in all the above processes, it is difficult to control the microstructure of the end product. This microstructure is of great importance for fabricating high quality electrolyte bodies.

It is an object of this invention to overcome the difficulties of the prior art by providing a product of high homogeneity capable of being made into a crystalline beta-alumina at lower temperatures than heretofore possible.

SUMMARY OF THE INVENTION

According to the invention, a chelated aluminum alkoxide solution is prepared by (1) mixing aluminum di(isopropoxide) acetoacetic ester chelate, [Al(OC$_3$H$_7$)$_2$(C$_6$H$_9$O$_3$)], with an alcohol, R—OH, where R is an alkyl group containing from 1 to 5 carbon atoms, or alternatively to obtain a chelated aluminum alkoxide compound in solution; (2) mixing an aluminum alkoxide compound, Al(OR)$_3$, where R is an alkyl group containing from 1 to 5 carbon atoms, with an alcohol, R—OH, and adding and mixing with a chelating agent, such as a beta-diketone or a gamma-diketone, or the like to obtain a chelated aluminum alkoxide compound in solution.

Selected reactants are mixed with the chelated aluminum alkoxide solution (1) a first reactant selected from the group consisting of a sodium alkoxide, Na(OR'), wherein each R' is an alkyl group containing from 1 to 3 carbon atoms, a sodium organic salt, R"C—OONa, wherein each R" is an alkyl group containing from 1 to 2 carbon atoms, and a mixture thereof, (2) a second reactant selected from the group consisting of an alkali metal organic salt, R"C—OOX, an alkaline earth metal organic salt, (R"C—OO)$_2$Y, an alkali metal alkoxide, X(OR'), an alkaline earth metal alkoxide, Y(OR')$_2$, and mixtures thereof, wherein X is the alkali metal and Y is the alkaline earth metal, wherein the selected reactants are those that produce a final product of crystalline beta-aluminas.

Specific examples of the selected reactants are sodium methoxide, magnesium methoxide, lithium methoxide, sodium acetate, magnesium acetate and lithium acetate. Preferably where a metal alkoxide is selected the same metal organic salt will not be reacted. Thus for example if a magnesium alkoxide is selected a magnesium acetate will not be used.

The reactants are polymerized by hydrolysis and condensation reactions when water is added. This water can be added at several stages in the process as illustrated by the examples below. Further polymerization may be promoted by concentration and evaporation between 50° C. and 100° C. and by addition of acids or bases to speed the reaction. A beta-aluminas precursor gel is obtained that when heated produces crystalline beta-aluminas at less than 1100° C. The gel may be heated in an oxidizing atmosphere, such as air so that no special precautions need be taken therewith.

The product produced by the method is a crystalline beta-aluminas material useful as a solid electrolyte material in making a sodium-sulfur battery.

DETAILED DESCRIPTION OF THE INVENTION IN PREFERRED EMBODIMENTS

In the method of this invention an aluminum alkoxide dissolved in alcohol is reacted with a chelating agent which can be a diketone such as acetylacetone to form a chelated aluminum alkoxide solution in alcohol.

Alternatively, a chelated aluminum alkoxide, produced by other methods, such as aluminum di(isopropoxide) acetoacetic ester chelate, $[Al(OC_3H_7)_2(C_6H_9O_3)]$, is dissolved in an alcohol to form a chelated aluminum alkoxide solution. This chelated aluminum alkoxide solution is then further reacted in one of several alternative processes.

In a first alternative, the chelated aluminum alkoxide solution is further mixed with magnesium alkoxide, sodium alkoxide and/or lithium alkoxide in alcohol to obtain a solution mixture containing chelated aluminum alkoxide and the alkoxides of magnesium, sodium and/or lithium. This solution is then reacted with water and alcohol and a few drops of an acid to effect hydrolysis and condensation polymerization reactions resulting in a beta-alumina gel. If needed, the sol can be further treated to produce a beta-alumina gel by increasing the solution concentration by evaporation at low temperature for example 50° C. or by heating the solution up to about 100° C. under continuous stirring.

In a second alternative, the alcoholic solution of chelated aluminum alkoxide is first reacted with water, or acidic water to effect partial hydrolysis and condensation polymerization reactions of the chelated aluminum alkoxide. This solution is then reacted with magnesium, sodium, lithium alkoxides in alcohol to produce reactions between the chelated aluminum alkoxide and the alkoxides of magnesium, sodium and lithium. Following this additional water and alcohol are added to produce further hydrolysis and condensation polymerization reactions resulting in a beta-alumina gel. If needed, the sol can be further treated to produce a beta-alumina gel by increasing the solution concentration by evaporation at low temperature for example 50° C. or by heating the solution up to about 100° C. under continuous stirring.

EXAMPLE 1

1. 224.8 gms 95% aluminum secondary butoxide, $[Al(OC_4H_9)_3]$ was mixed in a beaker containing 400 ml i-butanol, $[C_4H_9OH]$, 40 ml acetylacetone, $[CH_3COCH_2COCH_3]$ was added to the beaker and the mixture stirred with a teflon coated magnetic stirrer for 30 minutes. A clear yellow solution was obtained.

2. In a separate beaker 25 ml 30% sodium methoxide, $Na(OCH_3)$, 42.8 ml of 5 percent magnesium methoxide, $Mg(OCH_3)_2$ solution and 6.4 ml of 10 percent lithium methoxide $Li(OCH_3)$, and 200 ml anhydrous methanol were mixed. The mixture was stirred. A slightly translucent solution was obtained.

3. The solution prepared in step 2 was added to that prepared in step 1. The mixture was stirred until a clear brownish solution was obtained.

4. In a separate beaker approximately 30 ml of water was mixed with 45 ml methanol and about 10 drops of concentrated nitric acid. This aqueous methanol was added to the solution mixture obtained in step 3. A clear solution was obtained. This solution was kept in an oven at 70° C. to form translucent beta-alumina gel while standing overnight.

EXAMPLE 2

1. 224.8 gms of 95% $Al(OC_4H_9)_3$ was mixed in a beaker containing 400 ml i-butanol. 40 ml acetylacetone was added to the beaker and the mixture stirred about 30 minutes with a teflon coated magnetic stirrer. A clear yellow solution was obtained.

2. 10 ml water was mixed with 40 ml isopropanol, $C_3H_7OH$ and a few drops (about 10) of nitric acid. This aqueous isopropanol was added to the solution prepared in step 1 and stirred. A clear yellow solution was obtained.

3. 25 ml 30% sodium methoxide, 42.8 ml 5 percent magnesium methoxide and 6.4 ml 10 percent lithium methoxide were added to a beaker containing 100 ml anhydrous alcohol. The mixture stirred. A slightly translucent solution was obtained.

4. The solution prepared in step 3 was added to the solution obtained in step 2 and stirred. A clear brownish solution was obtained.

5. The solution obtained in step 4 was evaporated in an air oven at 70° C. to form a clear (deep brown) gel.

The gel obtained in Example 2 was further heat treated in air at 600° C. for two hours. Analysis of the product obtained indicated it was noncrystalline. The gel was then further heat treated in air at 700° C. for twelve hours again the product was noncrystalline. The gel was heat treated in air at 1525° C. for one hour the product was a mixture of beta-alumina and beta''-alumina. This first crystallization study was done at the higher temperature of 1525° C. just to confirm that procedure was proceeding correctly. Other tests and treatments were at lower temperatures as follows.

Substantially organic free noncrystalline gels were obtained after heat treatment in air at approximately 600° C. for two hours. Differential thermal analysis on Examples 1 and 2 were performed with the temperature rising at the rate of 5° C. per minute in air to examine the crystallization behavior. The DTA curve showed an extremely small exothermic peak at about 400° C. (which is related to burn out of the residual organics) one exothermic peak at 800° C. and another exothermic peak at 1020° C. It was anticipated that the exothermic peaks at 800° C. and 1020° C. represented two different crystalline phases.

Two heated gel samples were prepared from the material prepared in Example 2 which had been dried at about 70° C. in an air oven. Sample 1 was heat treated in air at about 800° C. for twelve hours. Sample 2 was heat treated in air at approximately 1020° C. for 12 hours. X-ray diffraction by the powder method gave results on the heat treated gels as follows: Sample 1 treated at 800° C. was noncrystalline whereas Sample 2 showed an indication of crystalline beta-alumina plus an indication of the presence of beta''-alumina.

The results indicate that beta-alumina gel prepared by the procedure of the invention can be used to produce polycrystalline beta and beta''-alumina at about 1020° C. Since beta-alumina gel that was treated at 800° C. for 12 hours was noncrystalline (in X-ray diffraction analysis) the sharp exothermic peak at 800° C. which was observed in the DTA above must be related to homogeneous nucleation processes which occurred prior to crystallization at about 1020° C. Electron diffraction analysis, however, which provides a more sensitive test than X-ray diffraction, shows that the material after heat treatment at 800° C. for 12 hours is indeed crystalline beta-alumina.

Gel samples from both Examples 1 and 2 were heat treated in air at 1525° C. for one hour. A crystalline beta and beta″-alumina was obtained with both samples. These tests showed that no special environment is required for heat treatment and that the gel obtained retains its stability from room temperature up to high sintering temperatures. Prior art references indicate the need to have special atmospheres in order to retain the Na ions in the material and/or the need for excess Na ions. These are not needed in the present invention.

The above discussion illustrates the heat treatment in a manner adapted to produce crystalline beta-aluminas for all of the examples. The precursor gel material obtained allows a final crystalline beta-alumina at a lower temperature than previously possible.

The process of Example 1 can be more generally described as a process for producing beta-alumina gel where a first solution is prepared by the steps of mixing an aluminum alkoxide compound, $Al(OR)_3$, where R is an alkyl group containing from 1 to 5 carbon atoms, with an alcohol, R—OH, and adding and mixing with a chelating agent, where the chelating agent is a beta-diketone or a gamma-diketone, to obtain a chelated aluminum alkoxide solution. A second solution is prepared by the steps of mixing, in a separate container, a sodium alkoxide compound, $Na(OR')$, a magnesium alkoxide compound, $Mg(OR')_2$ and a lithium alkoxide compound, $Li(OR')$, where R′ is an alkyl group containing 1 to 3 carbon atoms, in an anhydrous alcohol, R—OH. A third solution is obtained by mixing the second solution with the first solution. A fourth solution is prepared by mixing, in a separate container, water, an alcohol, R—OH, and an organic or inorganic acid. This fourth solution is added to the third solution and polymerized until a beta-aluminas gel is obtained. Finally, the beta-aluminas gel is heated in a manner adapted to produce crystalline beta-aluminas.

In a variation of Example 1, the reactants for solution two may be directly added to solution one without first mixing them in a separate container.

A third alternative involves reacting the chelated aluminum alkoxide solution with magnesium acetate in ethanol, water and an acid to produce another solution by hydrolysis and condensation reactions between chelated aluminum alkoxide and magnesium acetate. This solution is then reacted with sodium acetate, lithium acetate, water and an alcohol to produce a solution mixture containing magnesium-aluminate complex and the acetates of sodium and potassium. If appropriate concentration of precursors have been added a beta-alumina gel may be formed directly or the solution may be increased in concentration by evaporation at low temperature of about 70° C. to obtain the beta-alumina gel or the solution may be heated and evaporated at about 100° C. under continuous stirring to obtain the beta-alumina gel.

The polymerization of the precursor sol and gel is completed at the temperatures above. Depending on the relative concentration of ingredients and the amount of water added, the initial polymerizations may produce a completely polymerized gel that is ready for heat treatment. It may be, however, that additional water will need to be added as a final step to complete the polymerization process. This water may be added alone or as an aqueous alcohol and may contain an acid or base to speed the reaction and to control the pH. An aqueous alcohol is preferred as this allows better control of the reactions. Alternatively the completion of polymerization method may require evaporation at temperatures between 50° C. and 100° C. as discussed above. This applies generally to all of the examples and alternatives of the invention.

EXAMPLE 3

1. 224.8 gms 95% aluminum secondary butoxide, $[Al(OC_4H_9)_3]$ is mixed in a beaker containing 400 ml i-butanol, $[C_4H_9OH]$, 40 ml acetylacetone, $[CH_3COCH_2COCH_3]$ is added to the beaker and mixture stirred with a teflon coated magnetic stirrer to obtain a clear yellow solution.

2. In a separate beaker an aqueous alcoholic solution is prepared by mixing 11·382 gms anhydrous sodium acetate, $NaOOCCH_3$, 5·3203 gms magnesium acetate tetrahydrate, $Mg(OOCCH_3)_2 \cdot 4H_2O$, 1·707 gms lithium acetate dihydrate, $Li(OOCCH_3) \cdot 2H_2O$, about 200 ml alcohol and 50 ml water.

3. The solution prepared in step 2 is added to that prepared in step 1 with vigorous stirring to form a clear yellowish brown solution.

4. The solution in step 3 forms somewhat translucent gel on standing for several hours. However, gelling takes place rapidly on warming the solution at about 50° C. or more.

5. The product obtained from Example 3 can be further treated at approximately 1020° C. to obtain a crystalline beta and beta″-alumina.

A fourth alternative is to react the chelated aluminum alkoxide solution with magnesium acetate in alcohol, water to produce hydrolysis and condensation reactions between the chelated aluminum alkoxide and magnesium acetate. This solution is then reacted with alkoxides of sodium and lithium to give a solution mixture containing magnesium aluminate complex and the alkoxides of the alkali metals. This solution is then further treated in one of three ways. In the first way water and ethanol can be added to give a beta-alumina gel. In the second way water ethanol and an organic or inorganic base are added to give a beta-alumina gel. The third treatment involves increasing the solution concentration by evaporation at low temperature of about 50° C. to produce a beta-alumina gel; or else the solution could be heated up to 100° C. to produce beta-alumina gel by evaporation and heat.

EXAMPLE 4

A beta-alumina gel is prepared by reacting an aluminum alkoxide with an acetate and finally an alkoxide this is alternative process 3.

1. 224 gms 95% aluminum secondary butoxide, $[Al(OC_4H_9)_3]$ is mixed in a beaker containing 400 ml i-butanol, $[C_4H_9OH]$, 40 ml acetylacetone, $[CH_3COCH_2COCH_3]$ is added to the beaker and the mixture stirred with a teflon coated magnetic stirrer to obtain a clear yellow solution.

2. In a separate beaker an aqueous alcoholic solution is prepared by mixing 5·3203 gms magnesium acetate tetrahydrate, $Mg(OOCCH_3)_2 \cdot 4H_2O$, 1·707 gms lithium acetate dihydrate, $LiOOCCH_3 \cdot 2H_2O$, 50 ml alcohol and 10 ml water.

3. The solution prepared in step 2 is added to that in step 1 and stirred for 30 minutes or more. A clear solution is obtained.

4. 25 ml 30% sodium methoxide is diluted with 25 ml alcohol (preferably methanol) added to the solution in step 3.

5. The solution in step 4 forms somewhat translucent gel on standing for several hours. However, gelling takes place rapidly if (a) aqueous alcohol is added to the solution in step 4 or (b) the solution in step 4 is warmed at about 50° C. or more.

6. The product beta-alumina gel obtained by this procedure may be further heat treated at approximately 1020° C. to obtain a crystalline beta and beta''-alumina.

Examples 3 and 4 illustrate that alkali metal and alkaline earth metal alkoxides can be mixed with alkali metal and alkaline earth metal organic salts as reactants in the method of the invention to produce the product. The term organic salt as used herein is defined as the "salt of an organic acid".

A fifth alternative method substitutes aluminum di(isopropoxide) acetoacetic ester chelate, $[Al(OC_3H_7)_2(C_6H_9O_3)]$ for the chelated aluminum alkoxide solution that is initially prepared. Examples 8-9 illustrate the procedure.

EXAMPLE 5

In this example aluminum di(isopropoxide) acetoacetic ester chelate is reacted with alkoxides to obtain a beta-alumina gel. Water is added after mixing of the alkoxides.

1. 237·82 gms aluminum di(isopropoxide) acetoacetic ester chelate, $[Al(OC_3H_7)_2(C_6H_9O_3)]$, is mixed in a beaker containing 400 ml of an alcohol (preferably isopropanol) and stirred with a teflon coated magnetic stirrer to obtain a clear yellow solution.

2. In a separate beaker 25 ml 30% sodium methoxide, $Na(OCH_3)$, 42·8 ml of 5% magnesium methoxide, $Mg(OCH_3)_2$ solution and 6·4 ml of 10% lithium methoxide, $Li(OCH_3)$ and 200 ml anhydrous methanol are mixed.

3. The solution prepared in step 2 is added to that prepared in step 1. The mixture is stirred until a clear brownish solution is obtained.

4. In a separate beaker approximately 30 ml of water is mixed with 45 ml methanol and about 10 drops of concentrated nitric acid. This aqueous methanol is added to the solution mixture obtained in step 3. A clear solution is obtained.

5. The solution in step 4 forms somewhat translucent gel on standing for several hours. However, gelling takes place rapidly if (a) aqueous alcohol is added to the solution in step 4 or (b) the solution in step 4 is warmed at 50° C. or more.

6. The beta-alumina gel obtained by this procedure may be further heat treated at approximately 1020° C. to obtain a crystalline beta and beta''-alumina.

EXAMPLE 6

This example is similar to that of Example 5, however water is added prior to mixing the alkoxides.

1. 237·82 gms aluminum di(isopropoxide) acetoacetic ester chelate, $[Al(OC_3H_7)_2(C_6H_9O_3)]$, is mixed in a beaker containing 400 ml of an alcohol (preferably isopropanol) and stirred with a teflon coated magnetic stirrer to obtain a clear yellow solution.

2. 10 ml water is mixed with 40 ml isopropanol, $C_3H_7OH$ and a few drops (about 10) of nitric acid. This aqueous isopropanol was added to the solution prepared in step 1 and stirred. A clear yellow solution is obtained.

3. 25 ml 30% sodium methoxide, 42·8 ml 5 percent magnesium methoxide and 6·4 ml 10 percent lithium methoxide are added to a beaker containing 100 ml anhydrous alcohol. The mixture stirred. A slightly translucent solution is obtained.

4. The solution prepared in step 3 is added to the solution obtained in step 2 and stirred. A clear brownish solution is obtained.

5. The solution obtained in step 4 is evaporated in an air oven at 70° C. to form a clear (deep brown) gel.

6. The beta-alumina gel obtained by this procedure may be further heat treated at approximately 1020° C. to obtain a crystalline beta and beta''-alumina.

EXAMPLE 7

This example uses acetates to produce the product.

1. 237·82 gms aluminum di(isopropoxide) acetoacetic ester chelate, $[Al(OC_3H_7)_2(C_6H_9O_3)]$, is mixed in a beaker containing 400 ml of an alcohol (preferably isopropanol) and stirred with a teflon coated magnetic stirrer to obtain a clear yellow solution.

2. In a separate beaker an aqueous alcoholic solution is prepared by mixing 11·382 gms anhydrous sodium acetate, $NaOOCCH_3$, 5·3203 gms magnesium acetate tetrahydrate, $Mg(OOCCH_3)_2 \cdot 4H_2O$, 1·707 gms lithium acetate dihydrate, $LiOOCCH_3 \cdot 2H_2O$ about 200 ml alcohol and 50 ml water.

3. The solution prepared in step 2 is added to that prepared in step 1 with vigorous stirring to form a clear yellowish brown solution.

4. The solution in step 3 forms somewhat translucent gel on standing for several hours. However, gelling takes place rapidly on warming the solution at about 50° C. or more.

5. The beta-alumina gel obtained by this procedure may be further heat treated at approximately 1020° C. to obtain a crystalline beta and beta''-alumina.

EXAMPLE 8

This example uses a mixture of alkoxides and acetates.

1. 237·82 gms aluminum di(isopropoxide) acetoacetic ester chelate, $[Al(OC_3H_7)_2(C_6H_9O_3)]$, is mixed in a beaker containing 400 ml of an alcohol (preferably isopropanol) and stirred with a teflon coated magnetic stirrer to obtain a clear yellow solution.

2. In a separate beaker an aqueous alcoholic solution is prepared by mixing 5·3203 gms magnesium acetate tetrahydrate, $Mg(OOCCH_3)_2 \cdot 4H_2O$, 1·707 gms lithium acetate dihydrate, $LiOOCCH_3 \cdot 2H_2O$, 50 ml alcohol and 10 ml water.

3. The solution prepared in step 2 is added to that in step 1 and stirred for 30 minutes or more. A clear solution is obtained.

4. 25 ml 30% sodium methoxide is diluted with 25 ml alcohol (preferably methanol) added to the solution in step 3.

5. The solution in step 4 forms somewhat translucent gel on standing for several hours. However, gelling takes place rapidly if (a) aqueous alcohol is added to the solution in step 4 or (b) the solution in step 4 is warmed at about 50° C. or more.

6. The beta-alumina gel obtained by this procedure may be further heat treated at approximately 1020° C. to obtain a crystalline beta and beta''-alumina.

EXAMPLE 9

As a further example the mixture of step 1 of Example 5 using aluminum di(isopropoxide) acetoacetic ester chelate, [Al(OC$_3$H$_7$)$_2$ (C$_6$H$_9$O$_3$)] could be substituted for the chelating compound of Examples 2, 3, and 4 to obtain the precursor gel and final product.

The benefits of the invention are derived from the discovery that a chelating agent as used in the herein described manner results in an improved beta-alumina product. The general method is described as a process for producing beta-alumina gel by preparing a solution by having the steps of mixing an aluminum alkoxide compound, Al(OR)$_3$, with an alcohol, R—OH, wherein each R is an alkyl group containing from 1 to 5 carbon atoms, and adding and mixing therewith a chelating agent to obtain a chelated aluminum alkoxide solution.

An alternative solution is the use of aluminum di(isopropoxide) acetoacetic ester chelate, [Al(OC$_3$H$_7$)$_2$ (C$_6$H$_9$O$_3$)], that is mixed with an alcohol, R—OH, to obtain a solution of the chelated compound. Selected reactants are mixed with the chelated aluminum alkoxide solution of step a, (1) a first reactant selected from the group consisting of a sodium alkoxide, Na(OR'), wherein each R' is an alkyl group containing from 1 to 3 carbon atoms, a sodium organic salt, R"C—OONa, wherein each R" is an alkyl group containing from 1 to 2 carbon atoms, and a mixture thereof, (2) a second reactant selected from the group consisting of an alkali metal organic salt, R"C—OOX, an alkaline earth metal organic salt, R"C—OOY, an alkali metal alkoxide, X(OR'), an alkaline earth metal alkoxide, Y(OR')$_2$, and mixtures thereof, wherein X is the alkali metal and Y is the alkaline earth metal, wherein the selected reactants are those that produce a final product of crystalline beta-aluminas, and polymerizing the mixture by hydrolysis and condensation reactions in a manner adapted to produce a homogeneous beta-alumina precursor gel. The beta-alumina gel is heated in a manner adapted to produce a crystalline beta-alumina.

The examples show that the order of addition of the alkali metal organic salts, alkali metal alkoxides, alkaline earth metal organic salts, and alkaline earth metal alkoxides is not important. Water to promote hydrolysis and condensation reactions may be added to mixtures of the chelated aluminum alkoxide and selected reactants at several stages in the process after chelation as long as care is taken to obtain a homogeneous gel as the final product.

The chelation step is the key to the process of the invention since this allows the advantages described herein. The chelation of the aluminum alkoxide controls the polymerization reactions so that the more homogeneous gel and final product is obtained. It is important in the procedure of the invention to properly add the various ingredients so as to prevent precipitation as further illustrated in the examples.

The present invention as noted above results in an improved crystalline beta-alumina which is more homogeneous and which is produced at temperatures that are substantially lower than those employed in the prior art. In addition there is better control of sodium during subsequent high temperature heat treatment. Standard techniques along with standard equipment may be used in the methods of this invention. The product produced by the method is crystalline beta-aluminas material useful as a solid electrolyte material in making a sodium-sulfur battery.

The crystalline beta-aluminas obtained after heat treatment can be pulverized into powders of a desired size range. This powder could be formed into useful shapes and sintered at temperatures (e.g. 1500° C. to 1600° C.) with or without application of pressures, known in the art, to obtain a final ceramic product. Alternatively the precursor gel could be dried, pulverized and heat treated to produce crystalline beta-aluminas. However, this is not preferred since further pulverizing may be needed after the crystallization step prior to forming and sintering.

The weight percent composition of all of the gels and crystalline beta-aluminas obtained is:

| | |
|---|---|
| Al$_2$O$_3$ | 88.4 |
| Na$_2$O | 8.6 |
| MgO | 2.0 |
| Li$_2$O | 1.0 |

Although, all of the examples are based on the above composition, a wide compositional range of aluminum, sodium, magnesium, or lithium oxides can be used as discussed in the prior art references to produce crystalline beta-aluminas. Magnesium oxide and lithium oxide are often added to promote high temperature stability.

Examples of chelating agents useful in the present invention include beta-diketone, pentane 2:4-dione also known as acetylacetone; gamma-diketone, hexane 2:5-dione also known as acetonylacetone. Preferrable acetylacetone is used, of course, like chelating agents may also be used. As examples of inorganic acids useful in the invention the following may be used: hydrochloric acids, nitric acid, percholoric acid, sulphuric acid, phosphoric acid and the like, nitric acid being preferred. Organic acids that may be used are formic acid, acetic acid, oxalic acid and the like. Organic and inorganic bases are also useful in the invention. The bases are not essential but they speed up the gelation process. Salts of organic bases that are useful in the invention include ethylene diamine, triethanolamine, and the like.

Acidified water is defined herein as water having an acid content up to 0.1% acid by weight. This acid acts as a catalyst and keeps the pH low to prevent precipitation.

While the forms of the invention herein disclosed constitute presently preferred embodiments, many others are possible. It is not intended herein to mention all of the possible equivalent forms or ramifications of the invention. It is to be understood that the terms used herein are merely descriptive rather than limiting, and that various changes may be made without departing from the spirit or scope of the invention.

We claim:

1. A process for producing crystalline beta-aluminas comprising:
   a. preparing a chelated aluminum alkoxide solution;
   b. mixing selected reactants with the chelated aluminum alkoxide solution of step a, (1) a first reactant selected from the group consisting of a sodium alkoxide, Na(OR'), wherein each R' is an alkyl group containing from 1 to 3 carbon atoms, a sodium organic salt, R"C—OONa, wherein each R" is an alkyl group containing from 1 to 2 carbon atoms, and a mixture thereof, (2) a second reactant selected from the group consisting of an alkali metal organic salt, R"C—OOX, an alkaline earth metal organic salt, (R"C—OO)$_2$Y, an alkali metal alkoxide, X(OR'), an alkaline earth metal alkoxide, Y(OR')$_2$, and mixtures thereof, wherein X is the alkali metal and Y is the alkaline earth metal, wherein the selected reactants are those that produce a final product of crystalline beta-aluminas, and polymerizing the mixture by hydrolysis and condensation reactions in a manner adapted to produce a homogeneous beta-alumina precursor gel; and c. heating the beta-alumina gel in a manner adapted to produce crystalline beta-aluminas.

2. A process as recited in claim 1, wherein the step of preparing a chelated aluminum alkoxide solution further comprises mixing aluminum di(isopropoxide) acetoacetic ester chelate, [Al(OC$_3$H$_7$)$_2$ (C$_6$H$_9$O$_3$)], with an alcohol, R—OH, where R is an alkyl group containing from 1 to 5 carbon atoms.

3. A process for producing crystalline beta-alumina comprising:
   a. preparing a first solution by the steps of mixing an aluminum alkoxide compound, Al(OR)$_3$, with an alcohol, R—OH, wherein each R is an alkyl group, containing from 1 to 5 carbon atoms, and adding and mixing therewith a chelating agent to obtain a chelated aluminum alkoxide solution;
   b. preparing a second solution by the steps of mixing with the chelated aluminum alkoxide solution of step a, (1) a first reactant selected from the group consisting of a sodium alkoxide, Na(OR'), wherein each R' is an alkyl group containing from 1 to 3 carbon atoms, an organic sodium salt, R"C—OONa, wherein each R" is an alkyl group containing from 1 to 2 carbon atoms, and a mixture thereof, (2) a second reactant selected from the group consisting of an alkali metal organic salt, R"C—OOX, an alkaline earth metal organic salt, (R"C—OO)$_2$Y, an alkali metal alkoxide, X(OR'), an alkaline earth metal alkoxide, Y(OR')$_2$, and mixtures thereof, wherein X is the alkali metal and Y is the alkaline earth metal and (3) a third reactant selected from the group consisting of water, and acidified water, in a manner and in amounts adapted to produce a solution containing partially hydrolyzed aluminum alkoxide and other reactants;
   c. polymerizing the solution of step b in a manner adapted to produce a beta-alumina gel; and
   d. heating the beta-alumina gel for a time and at a temperature adapted to produce a crystalline beta-alumina.

4. A process as recited in claim 3, wherein all of the reactants of step b are first mixed in a separate container with an alcohol, R—OH, and then mixed with the solution of step a.

5. A process as recited in claim 3, wherein the polymerization step c further comprises adding and mixing a reactant selected from the group consisting of water, an aqueous alcohol, R—OH, and an aqueous alcohol, R—OH, containing a base.

6. A process as recited in claim 3, wherein the polymerization step c further comprises increasing the solution concentration by evaporation at a temperature at about 50° C. to about 100° C. in a manner adapted to produce a beta-alumina gel.

7. A process as recited in claim 3 wherein the heating step d further comprises heating the beta-alumina gel to a temperature of about 1020° C. in an oxidizing atmosphere of air, oxygen, or a mixture thereof.

8. A process as recited in claim 3, wherein the chelating agent is selected from the group consisting of a beta-diketone and a gamma-diketone.

9. A process for producing crystalline beta-alumina comprising:
   a. preparing a first solution by the steps of mixing an aluminum alkoxide compound, Al(OR)$_3$, with an alcohol, R—OH, wherein each R is an alkyl group containing from 1 to 5 carbon atoms, and adding and mixing therewith a chelating agent to obtain a chelated aluminum alkoxide solution;
   b. preparing a second solution by the steps of mixing with the chelated aluminum alkoxide solution of step a, (1) a first reactant selected from the group consisting of a sodium alkoxide, Na(OR'), a sodium organic salt, R"C—OONa, and a mixture thereof, wherein each R' is an alkyl group containing from 1 to 3 carbon atoms and each R" is an alkyl group containing from 1 to 2 carbon atoms; (2) a second reactant selected from the group consisting of a magnesium alkoxide, Mg(OR')$_2$, lithium alkoxide, LiOR' a magnesium organic salt, (R"C—OO)$_2$Mg, a lithium organic salt, R"C-OOLi, and mixtures thereof; (3) a third reactant selected from the group consisting of water, and acidified water, in a manner and in amounts adapted to produce a solution containing chelated partially hydrolyzed aluminum alkoxide and sodium, magnesium, and lithium compounds;
   c. polymerizing the solution of step b in a manner adapted to produce a beta-alumina gel; and
   d. heating the beta-alumina gel for a time and at a temperature adapted to produce a crystalline beta-alumina.

10. A process as recited in claim 9, wherein all of the reactants of step b are first mixed in a separate container with an alcohol, R—OH, and then mixed with the solution of step a.

11. A process as recited in claim 9, wherein the polymerization step c is completed by adding and mixing a reactant selected from the group consisting of water; an aqueous alcohol, R—OH, and an aqueous alcohol, R—OH, containing a base.

12. A process as recited in claim 9, wherein the polymerization step c is completed by increasing the solution concentration by evaporation at a temperatue at about 50° C. to about 100° C. in a manner adapted to produce a beta-alumina gel.

13. A process as recited in claim 9, wherein the heating step d further comprises heating the beta-alumina gel to a temperature of about 1020° C.

14. A process as recited in claim 9, wherein the chelating agent is selected from the group consisting of beta-diketone or gamma-diketone.

15. A process for producing crystalline beta-alumina comprising:
   a. preparing a first solution by the steps of mixing an aluminum alkoxide compound, Al(OR)$_3$, where R is an alkyl group containing from 1 to 5 carbon atoms, with an alcohol, R—OH, and adding and mixing with a chelating agent, where the chelating agent is a beta-diketone or a gamma-diketone, to obtain a chelated aluminum alkoxide compound;
   b. preparing a second solution by the steps of mixing, in a separate container, a sodium alkoxide compound, Na(OR'), a magnesium alkoxide compound, Mg(OR')$_2$ and a lithium alkoxide compound, Li(OR'), where R' is an alkyl group containing 1 to 3 carbon atoms, in an anhydrous alcohol, R—OH;
   c. preparing a third solution by mixing the solutions obtained in steps a and b;

d. preparing a fourth solution by mixing, in a separate container, water, an alcohol, R—OH, and an organic or inorganic acid;

e. adding the solution of step d to the solution of step c and polymerizing the solution until a beta-alumina gel is obtained; and f. heating the beta-alumina gel for a time and at a temperature adapted to produce a crystalline beta-alumina.

16. A process as recited in claim 15, wherein the polymerization step e further comprises increasing the solution concentration by evaporation at a temperature of about 50° C. to about 100° C. in a manner adapted to produce a beta-aluminas gel.

17. A process as recited in claim 15, wherein the heating step f further comprises heating the beta-aluminas gel to a temperature of about 1020° C.

18. A process for producing beta-alumina gel comprising:

a. preparing a first solution by the steps of mixing an aluminum alkoxide compound, $Al(OR)_3$, where R is an alkyl group containing from 1 to 5 carbon atoms, with an alcohol, R—OH and adding and mixing with a chelating agent to obtain a chelated aluminum alkoxide solution;

b. preparing a second solution by the steps of mixing an inorganic acid, water and alcohol, R—OH;

c. adding and mixing the first and second solutions, to form a third solution;

d. preparing a fourth solution by mixing in a separate container a sodium alkoxide compound, $Na(OR')$, a magnesium alkoxide compound, $Mg(OR')_2$, and a lithium alkoxide compound, $Li(OR')$, where R' is an alkyl group containing 1 to 3 carbon atoms, together with anhydrous alcohol R—OH;

e. polymerizing the solution of step b in a manner adapted to produce a beta-alumina gel; and f. heating the beta-alumina gel for a time and at a temperature adapted to produce a crystalline beta-alumina.

19. A process for producing beta-alumina gel comprising:

a. preparing a first solution by the steps of mixing an aluminum alkoxide compound, $Al(OR)_3$, where R is an alkyl group containing from 1 to 5 carbon atoms, with an alcohol, R—OH, and adding and mixing a chelating agent, where the chelating agent is a beta-diketone or a gamma-diketone, to obtain a chelated aluminum alkoxide solution;

b. preparing a second solution by steps of mixing, in the first solution, a sodium alkoxide compound, $Na(OR')$, a magnesium alkoxide compound, $Mg(OR')_2$ and a lithium alkoxide compound, $Li(OR')$, where R' is an alkyl group containing 1 to 3 carbon atoms, in an anhydrous alcohol R—OH, to obtain a solution mixture containing chelated aluminum alkoxide and the alkoxides of sodium, magnesium and potassium;

c. preparing a third solution by mixing, in a separate container, water, an alcohol, R—OH, and an acid selected from the group consisting of hydrochloric acid, nitric acid, perchloric acid, sulphuric acid, phosphoric acid, formic acid, acetic acid, and oxalic acid;

d. adding the solution of step c to the solution of step b in a manner adapted to cause hydrolysis and condensation polymerization reactions to produce a beta-alumina gel; and e. heating the beta-alumina gel for a time and at a temperature adapted to produce a crystalline beta-alumina.

20. A process as recited in claim 1, 2, 3, 4, 9, 15, 18 or 19 wherein the crystalline beta-alumina is pulverized, formed and sintered to produce a final ceramic product.

* * * * *